June 13, 1933.  T. V. BUCKWALTER  1,913,745
JOURNAL BOX AND COVER
Filed May 5, 1932  2 Sheets-Sheet 2
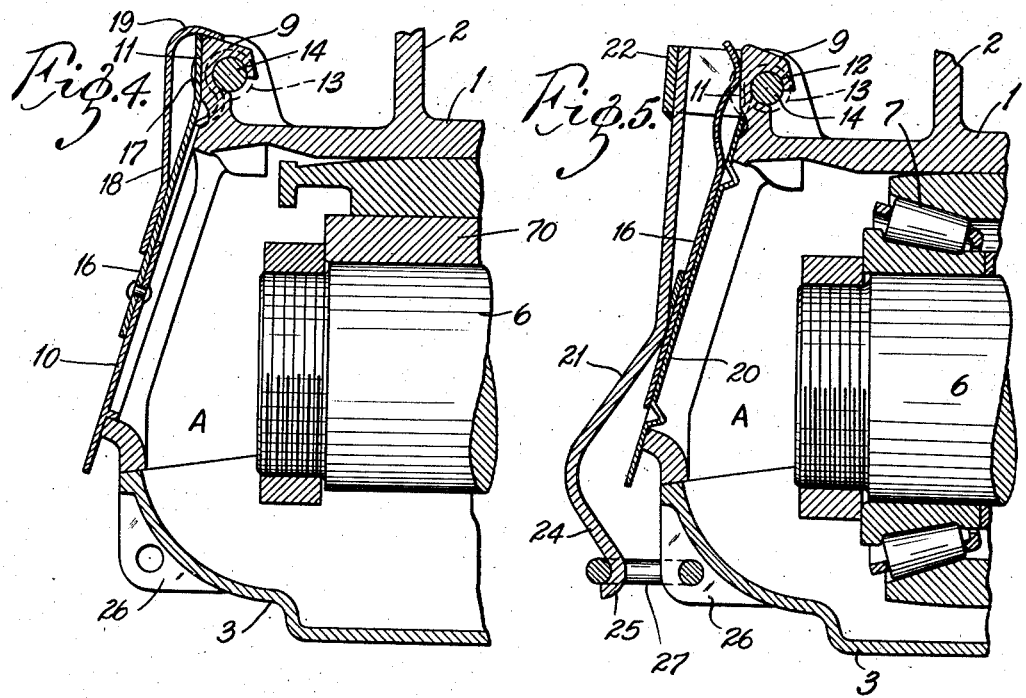
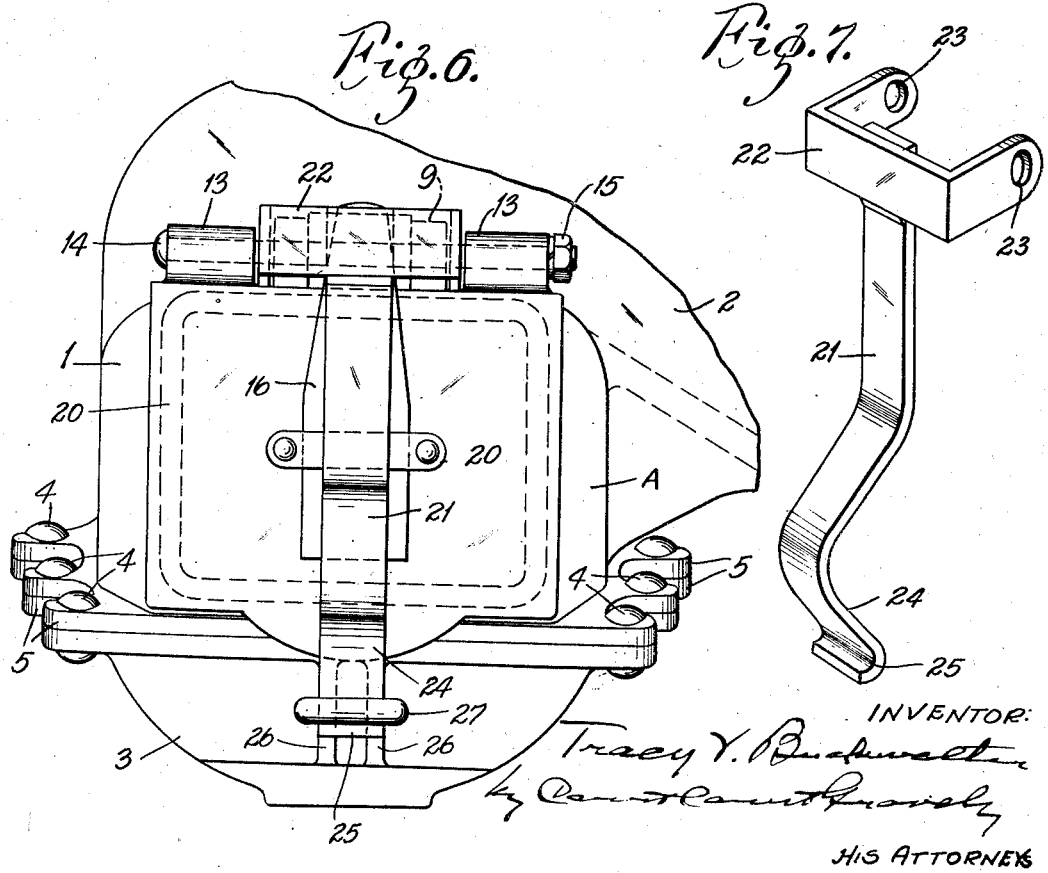
INVENTOR:
Tracy V. Buckwalter
HIS ATTORNEYS Patented June 13, 1933

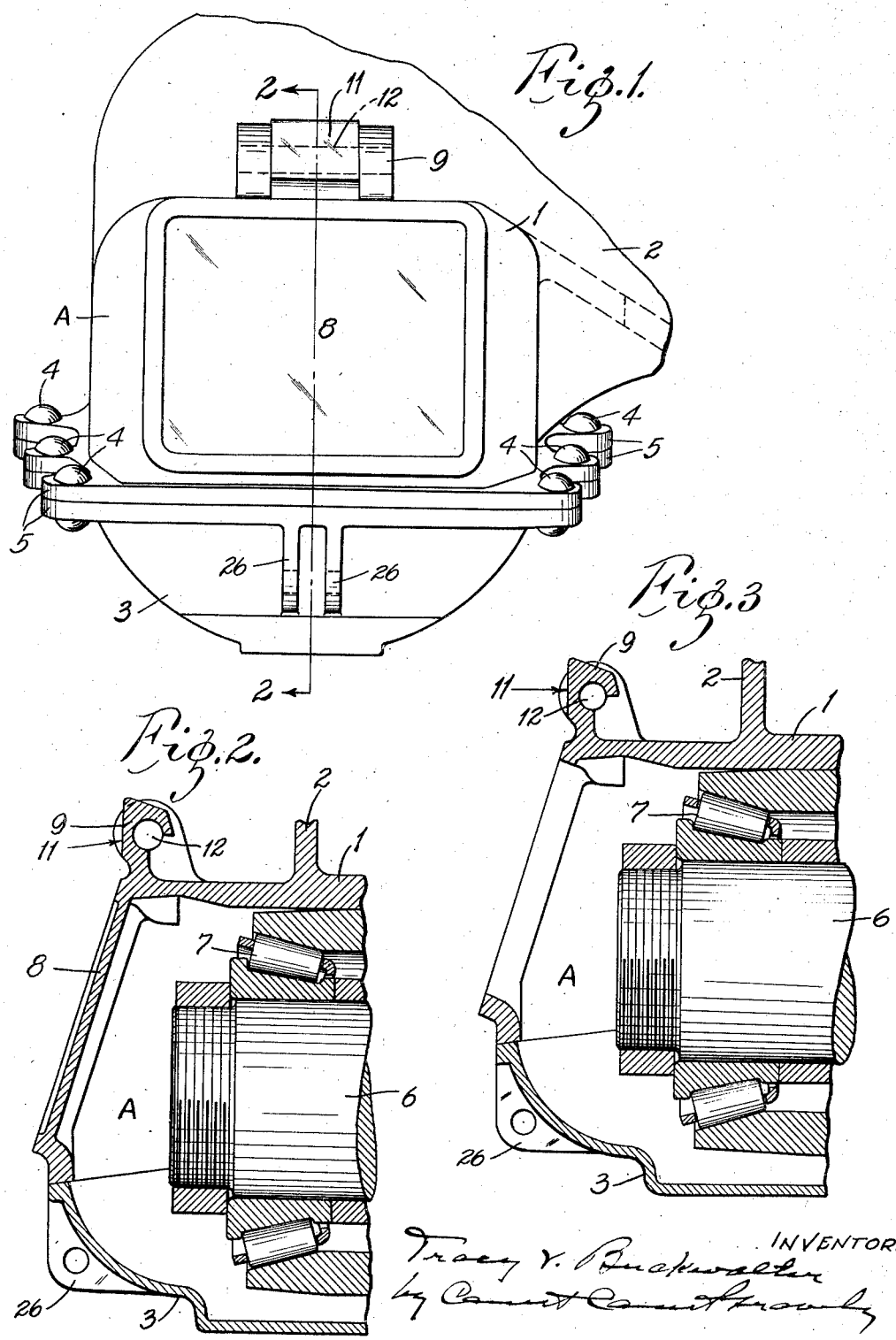

1,913,745

UNITED STATES PATENT OFFICE

TRACY V. BUCKWALTER, OF CANTON, OHIO, ASSIGNOR TO THE TIMKEN ROLLER BEARING COMPANY, OF CANTON, OHIO, A CORPORATION OF OHIO

JOURNAL BOX AND COVER

Application filed May 5, 1932. Serial No. 609,353.

My invention relates to railway car journal box end covers, adaptable for use with antifriction bearings as well as with plain bearings.

Journal boxes for axles provided with antifriction bearings do not need interior inspection, except at infrequent intervals. Thus such boxes may be provided with an integral end plate, thereby eliminating the danger of losing lubricant. However, plain bearing journal boxes require frequent inspection and re-packing with waste impregnated with lubricant, so that if said roller bearings are replaced with plain bearings, it becomes necessary to remove the integral end cover and replace it with some sort of hinged or removable end cover. So long as plain bearings are used, the present standard A. R. A. journal box cover or any other form may be used; but if the plain bearings are in turn replaced with antifriction bearings, it becomes necessary to provide an oil tight end closure.

Accordingly, the principal object of the present invention is a journal box and cover suitable for use with plain bearings and also with roller bearings. A further object of the invention is a process for providing a journal box with a hinged or removable cover after the original integral end cover has been removed. Other objects and advantages will appear hereinafter.

The invention consists principally in a journal box cover which includes a portion similar to present standard covers, hingedly secured to a lug on the journal box and provided with a spring holding it in closed position, but also provided with a further closure spring causing the cover to maintain an oil tight connection with the end of the journal box. The invention further consists in the journal box and end cover, in the parts and combinations and arrangements of parts and in the process hereinafter described and claimed.

In the accompanying drawings, wherein like reference characters refer to like parts wherever they occur, Fig. 1 is an end view of a journal box provided with an integral end cover plate and also provided with lugs for receiving an end cover embodying my invention, Fig. 2 is a sectional view on the line 2—2 in Fig. 1, Fig. 3 is a view similar to Fig. 2 showing the integral cover plate removed, Fig. 4 is a view similar to Fig. 3, showing a plain bearing and a cover embodying my invention, Fig. 5 is a similar view showing the axle again provided with roller bearings and the cover provided with the additional spring clamping means of my invention, Fig. 6 is an end view of a journal box with said cover and said spring in position; and Fig. 7 is a perspective view of said spring.

Fig. 1 illustrates a journal box whose upper portion 1 is integral with a truck side frame member 2 and which has a separate lower portion 3 secured to the upper portion 1 by means of bolts 4 extending through mating flanges 5 provided on the two journal box portions. Each end of the axle 6 extends into a journal box A and taper roller bearings 7 are interposed between each journal box and the axle, portions only of the bearings being shown in the drawings. As roller bearings require inspections only at infrequent intervals, the upper portion 1 of the journal box is provided with an integral end closure plate 8.

With a view to the contingency of the roller bearings 7 being replaced with plain bearings 70 (as might happen if the roller bearings 7 were damaged when the car was on the line of some railroad not provided with facilities for repairing roller bearings) the outer end of the top of the journal box 1 is provided with a lug 9 to which a cover 10 may be secured. Said lug 9 has the middle portion 11 thereof flattened in a substantially vertical plane and is provided with a horizontal bore 12 extending therethrough, that is, a bore extending transversely of the journal box and axle. Said lug 9 conforms substantially to present standard designs.

If the roller bearings 7 are removed and replaced by plain bearings 70, as shown in Fig. 4, the integral cover plate 8 must be removed and a separate cover 10 mounted on the journal box. Said cover 10 is provided with hinge knuckles 13 overlapping the ends of said journal box lug 9, and a bolt 14 extending through said knuckles 13 and said journal box lug 9 pivotally supports the cover 10. A nut 15 is provided on the end of said bolt 14. A spring 16 secured to the cover has a portion 17 engaging the flattened vertical face 11 of said journal box lug 9 and an additional spring 18 may be provided with a hook portion 19 overlapping the top of the lug 9. Such a construction is satisfactory for plain bearings, (being substantially the present standard A. R. A. cover) since the only lubricant is contained in waste packed in the journal box; and said cover 10 is easily removed for purposes of inspecting the bearings and repacking the box.

Such a cover 10 as is shown in Fig. 4 is not satisfactory for roller bearings; so that, if the plain bearings are again replaced by roller bearings, a different cover construction must be provided. In the construction shown in Figs. 5, 6, and 7, the cover 20 has hinge knuckles 13 by means of which it is pivotally mounted on the journal box lug 9, as in the construction shown in Fig. 4 and it has a spring 16 engaging the flattened vertical face 11 of the journal box lug 9. In order to make an oil tight joint between the inner face of said cover 20 and the end of the journal box A, an additional clamp spring 21 is provided. Said clamp spring 21 has a yoke 22 at the top fitting over the ends of the journal box lug and provided with perforations 23 in the ends of its arms by which it is mounted on the same bolt 14 that holds the journal box cover. The body of said spring 21 is bowed outwardly and the lower end 24 thereof is then bent inwardly, terminating in a hook portion 25. The cover portion of the journal box is provided with perforated ears 26 receiving a loop 27 that holds the hook end 25 of said spring. The end 25 of the spring must be forced into said loop 27 with the result that the body of the spring 21 bears with considerable pressure against the journal box cover, thus forcing it into firm engagement with the journal box.

The herein described journal box cover is adapted for use either with plan bearings or roller bearings. The process of changing from integral cover plate to the separable hinged cover permits the change from roller bearings to plain bearings and back to roller bearings, always providing a closure for the journal box suited to the requirements of the particular bearing in use. Obviously, numerous changes may be made without departing from the construction and we do not wish to be limited to the precise construction shown.

What I claim is:

1. A journal box adapted for use with roller bearings and provided with an integral end closure plate completely closing the end thereof, said journal box having at its top a lug for mounting a separate journal box cover.

2. A journal box adapted for use with roller bearings and provided with an integral end closure plate completely closing the end thereof, said journal box having at its top a lug for mounting a separate journal box cover and having at its bottom means for holding a securing device to said cover.

3. A journal box cover construction comprising a journal box having a lug at the top thereof, a cover hingedly secured to said lug, a spring on said cover bearing against said lug, a clamp spring pivotally secured to said lug and engaging said cover and means secured to the lower end of said journal box for holding the end of said clamp spring.

4. A journal box cover construction comprising a journal box having a lug at the top thereof, a cover hingedly secured to said lug, a spring on said cover bearing against said lug, a clamp spring pivotally secured to said lug and engaging said cover, the body portion of said clamp spring being bowed outwardly and the lower end thereof being rebent towards said journal box and terminating in a hook, the lower end of said journal box having perforated ears and a loop mounted in said ears for engaging the hook at the lower end of said clamp spring.

5. A journal box cover construction comprising a journal box having a perforated lug at the top thereof, a cover having hinge knuckles spaced from the ends of said lug, a spring on said cover bearing against said lug, a clamp spring having a yoke whose arms are perforated near their ends and overlap the ends of said lug, a pivot bolt extending through said lug, said yoke arms and said hinge knuckles, said clamp spring having a bowed body engaging said cover and means secured to the lower end of said journal box for holding the end of said clamp spring.

Signed at Canton, Ohio, this 29th day of April, 1932.

TRACY V. BUCKWALTER.